(12) United States Patent
Wu et al.

(10) Patent No.: US 12,467,790 B2
(45) Date of Patent: Nov. 11, 2025

(54) SPECTROMETER

(71) Applicant: OTO PHOTONICS INC., Hsinchu (TW)

(72) Inventors: Hao-Ping Wu, Hsinchu (TW); Chien-Hsiang Hung, Hsinchu (TW); Kuei-Wu Chang, Hsinchu (TW)

(73) Assignee: OTO PHOTONICS INC., Hsinchu (TW)

( * ) Notice: Subject to any disclaimer, the term of this patent is extended or adjusted under 35 U.S.C. 154(b) by 85 days.

(21) Appl. No.: 18/110,882

(22) Filed: Feb. 16, 2023

(65) Prior Publication Data
US 2023/0266169 A1 Aug. 24, 2023

(30) Foreign Application Priority Data

Feb. 18, 2022 (TW) .................................. 111106089

(51) Int. Cl.
*G01J 3/28* (2006.01)
*G01J 3/02* (2006.01)
*G02B 27/10* (2006.01)

(52) U.S. Cl.
CPC ............ *G01J 3/2823* (2013.01); *G01J 3/0208* (2013.01); *G01J 3/0213* (2013.01); *G01J 3/0227* (2013.01); *G01J 3/0229* (2013.01); *G02B 27/1013* (2013.01)

(58) Field of Classification Search
CPC ...... G01J 3/2823; G01J 3/0208; G01J 3/0213; G01J 3/0227; G01J 3/0229; G01J 3/0256; G01J 3/0291; G01J 3/18; G02B 27/1013
See application file for complete search history.

(56) References Cited

U.S. PATENT DOCUMENTS

| 5,090,807 A | * | 2/1992 | Tai ......................... G06V 10/88 |
| | | | 356/330 |
| 8,305,575 B1 | * | 11/2012 | Goldstein ............. G01J 3/0229 |
| | | | 356/326 |
| 11,041,752 B2 | | 6/2021 | Popat |

(Continued)

FOREIGN PATENT DOCUMENTS

| CN | 202471249 U | 10/2012 |
| CN | 102812340 A | 12/2012 |

(Continued)

*Primary Examiner* — Kara E. Geisel
*Assistant Examiner* — Jonathon Cook
(74) *Attorney, Agent, or Firm* — Cheng-Ju Chiang

(57) ABSTRACT

A spectrometer includes a base, a light input, a light splitter, an image sensor and a shader. The light input is disposed on the base for receiving an optical signal. The light splitter is disposed on the base to split the received optical signal into a plurality of spectral components. The image sensor is disposed on the base, and has a sensing surface for receiving the plurality of spectral components. The shader having a non-ring shape is disposed between the light splitter and the image sensor, and is located on a projection path of a part of the plurality of spectral components. A shadow generated by the shader on the sensing surface falls on an area of the sensing surface corresponding to the part of the plurality of spectral components. A divergence angle of each spectral component out of the part of the plurality of spectral components is reduced.

18 Claims, 13 Drawing Sheets

(56) References Cited

U.S. PATENT DOCUMENTS

| | | | |
|---|---|---|---|
| 2013/0235376 A1* | 9/2013 | Kamijo | G01J 3/0297 |
| | | | 356/328 |
| 2015/0260573 A1* | 9/2015 | Ishimaru | A61B 5/14532 |
| | | | 356/451 |
| 2018/0053038 A1* | 2/2018 | Robinson | G01J 3/2823 |
| 2019/0041329 A1* | 2/2019 | Hill | G02B 27/286 |
| 2019/0154505 A1* | 5/2019 | Haase | G01J 3/18 |
| 2020/0264050 A1* | 8/2020 | Auner | G01N 21/0303 |
| 2020/0278250 A1* | 9/2020 | Scarcelli | G01J 3/4406 |
| 2022/0034791 A1* | 2/2022 | Zhang | G01N 21/8422 |
| 2022/0381611 A1* | 12/2022 | Zhou | G01J 3/021 |
| 2023/0194341 A1* | 6/2023 | Nam | G01J 3/0229 |
| | | | 356/311 |
| 2024/0011903 A1* | 1/2024 | Nolte | G01N 15/1429 |

FOREIGN PATENT DOCUMENTS

| | | |
|---|---|---|
| CN | 102812340 B | 12/2014 |
| CN | 106461460 B | 11/2018 |
| CN | 217083960 U | 7/2022 |
| JP | 2000-321138 A | 11/2000 |
| TW | 202102822 A | 1/2021 |
| TW | 202113497 A | 4/2021 |

\* cited by examiner

SPECTROMETER

CROSS REFERENCE TO RELATED APPLICATIONS

The present invention claims benefit of Taiwan Application No. 111106089, filed on Feb. 18, 2022, the disclosure of which is incorporated by reference herein.

BACKGROUND OF THE INVENTION

Field of the Invention

The present invention relates to an optical measurement equipment, particularly is related to a spectrometer.

Description of Related Art

A spectrometer is a scientific instrument that is designed to apply optical principles to separate and split lights with complex compositions into spectral light components. The spectrometer can be used to observe, analyze and process a structure and composition of substances, and has advantages of having high analysis precision, a large measurement range, a fast measuring speed and less sample consumption, etc. Therefore, assistance of spectrometers is needed for all of distinguishing of molecular characteristics, measurement of concentrations, identification of substances, and measurement of celestial spectra, etc. In addition, spectrometers are widely used in various fields such as metallurgy, geology, petrochemical industry, medicine and health, environmental protection, resources and hydrological survey, etc.

However, because a spectrometer is affected by an initial spectrum of input optical signals, a light splitting efficiency of a grating for every light with different wavelengths, and a photosensitive efficiency of an image sensor for every light with different wavelengths, etc., a situation that an excessive strong energy in a specific wavelength region may happen, and results in the spectrometer failing to achieve expected measurement results.

BRIEF SUMMARY OF THE INVENTION

The present invention is provided with a spectrometer, by which a portion of a plurality of spectral components having excessively high light intensity can be suppressed.

The present invention is provided with a spectrometer. The spectrometer includes a base, a light input, a light splitter, an image sensor and a shader. The light input is disposed on the base for receiving an optical signal. The light splitter is disposed on the base for incidence of the optical signal received by the light input, and to split the optical signal into a plurality of spectral components. The image sensor is disposed on the base, and has a sensing surface for receiving the plurality of spectral components. The sensing surface has a virtual central line extending along an arrangement direction of the plurality of spectral components. The shader is disposed between the light splitter and the image sensor according to an optical influence factor, and is located on a projection path of a portion of the plurality of spectral components. The shader shades the portion of the plurality of spectral components to suppress a part of the plurality of spectral components having excessively high light intensity. A shadow generated by the shader on the sensing surface does not fall on the virtual central line.

In a preferable embodiment of the present invention, the sensing surface extends on the base and has two end portions. The shadow generated by the shader on the sensing surface does not fall on the two end portions.

In a preferable embodiment of the present invention, the shader is directly attached to the image sensor, or is disposed relatively close to the image sensor or away from the image sensor.

In a preferable embodiment of the present invention, the spectrometer further includes a mounting part. The shader is disposed on the mounting part, and the mounting part is disposed on the base so that the shader is disposed on the base via the mounting part.

In a preferable embodiment of the present invention, the mounting part has an adjusting structure configured to adjust a setting angle or a setting position of the shader relative to the base or a cover body, to adjust a setting position of the shader along a direction parallel to the sensing surface, or to adjust a setting position of the shader between the cover body and the base.

In a preferable embodiment of the present invention, the optical influence factor includes at least one of a preliminary frequency spectrum of the optical signal, a splitting efficiency of the light splitter for each of lights with different wavelengths, and a light sensing efficiency of the image sensor for the each of lights with different wavelengths.

In a preferable embodiment of the present invention, the shader is an opaque piece, a neutral density filter or a filter.

In a preferable embodiment of the present invention, a shape of the shader is changed based on the optical influence factor.

In a preferable embodiment of the present invention, the shader includes a plurality of different shading pieces. Each of the plurality of different shading pieces is replaceably disposed at a fixed position between the light splitter and the image sensor according to the optical influence factor. The plurality of different shading pieces are different from one another due to their shapes, sizes or oblique angles relative to the base.

In a preferable embodiment of the present invention, the spectrometer further includes a mounting part. The shader is disposed on the mounting part, and the mounting part is disposed on the base so that the shader is disposed on the base via the mounting part. The mounting part has an adjusting structure configured to adjust a setting angle or a setting position of the shader relative to the base or a cover body, to adjust a setting position of the shader along a direction parallel to the sensing surface, or to adjust a setting position of the shader between the cover body and the base. The sensing surface extends on the base and has two end portions. The shadow generated by the shader on the sensing surface does not fall on the two end portions. The optical influence factor includes at least one of a source of the optical signal, a splitting efficiency of the light splitter for the plurality of spectral components with different wavelength ranges, and a light sensing efficiency of the image sensor for the plurality of spectral components with different wavelength ranges. The shader includes a plurality of different shading pieces. Each of the plurality of different shading pieces is replaceably disposed at a fixed position between the light splitter and the image sensor according to the optical influence factor. The plurality of different shading pieces are different from one another due to their shapes, sizes or oblique angles relative to the base.

The present invention is alternatively provided with a spectrometer. The spectrometer includes a base, a light input, a reflector, a planar optical grating, a focusing mirror, an image sensor, a shader and a mounting part. The light input is disposed on the base for receiving an optical signal. The reflector is disposed on the base for incidence of the optical signal received by the light input and to reflect the incident optical signal. The planar optical grating is disposed on the base for incidence of the optical signal reflected by the reflector, and configured to split the optical signal into a plurality of spectral components. The focusing mirror is disposed on the base for focusing the plurality of spectral components split by the planar optical grating. The image sensor is disposed on the base, and has a sensing surface for receiving the plurality of spectral components focused by the focusing mirror. The sensing surface extends along the base, and has a virtual central line extending along an arrangement direction of the plurality of spectral components and two end portions. The shader is disposed between the focusing mirror and the image sensor according to an optical influence factor. The shader is an opaque piece, and is located on a projection path of a portion of the plurality of spectral components to shade the portion of the plurality of spectral components for suppressing a part of the plurality of spectral components having excessively high light intensity. A shadow generated by the shader on the sensing surface does not fall on the virtual central line and the two end portions. The mounting part is disposed on the base, and the shader is disposed on the mounting part so that the shader is disposed on the base via the mounting part. The mounting part has an adjusting structure configured to adjust a setting angle or a setting position of the shader relative to the base.

To sum up, the spectrometer in accordance with the present invention can achieve that a part of the plurality of spectral components is shaded to suppress a portion of the plurality of spectral components having excessively high light intensity by disposing the shader between the light splitter and the image sensor.

DETAILED DESCRIPTION OF THE INVENTION

Figure 1:
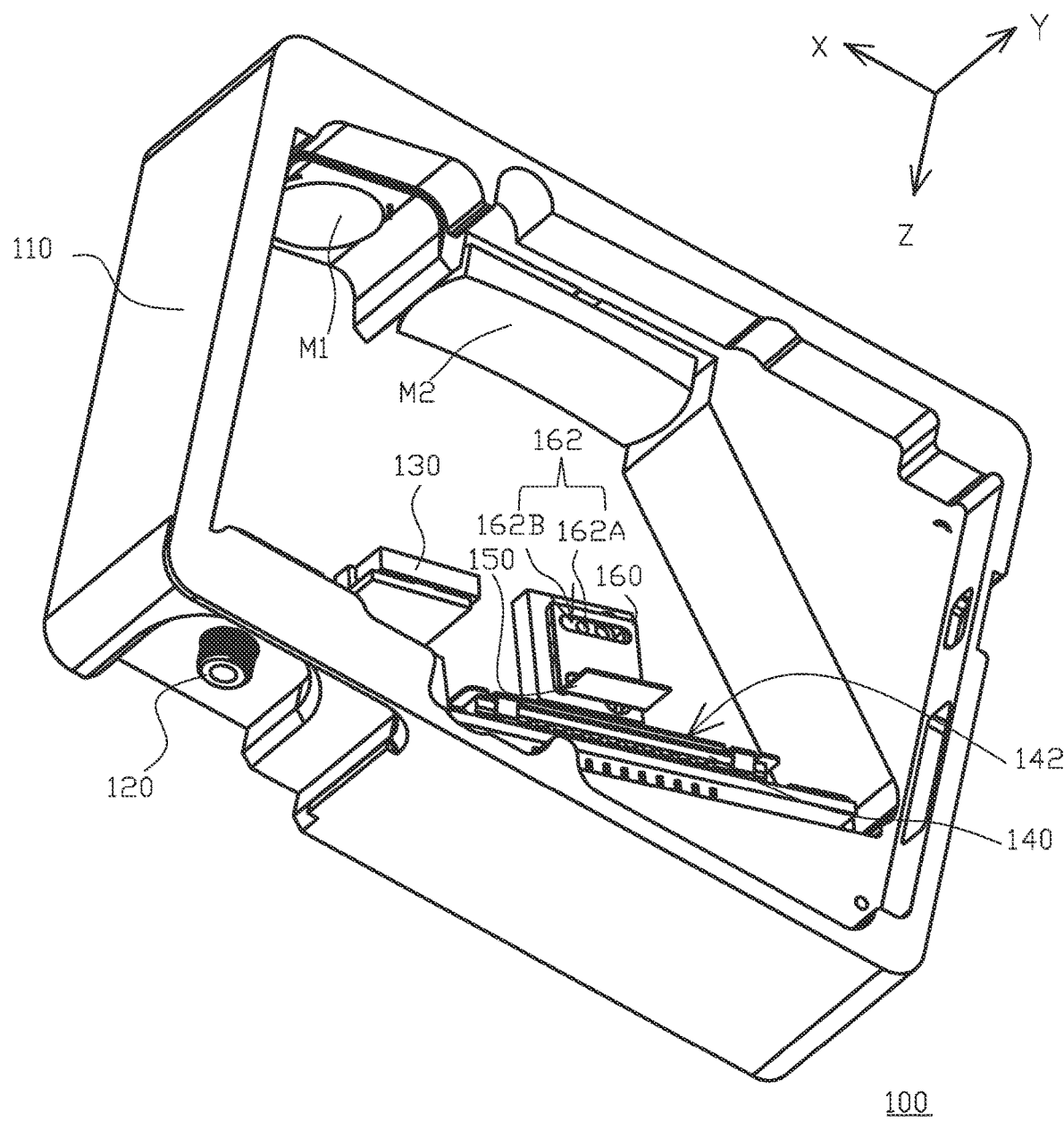
FIG. 1 shows a schematic perspective view of a spectrometer in accordance with a preferred embodiment of the present invention.
Figure 2:
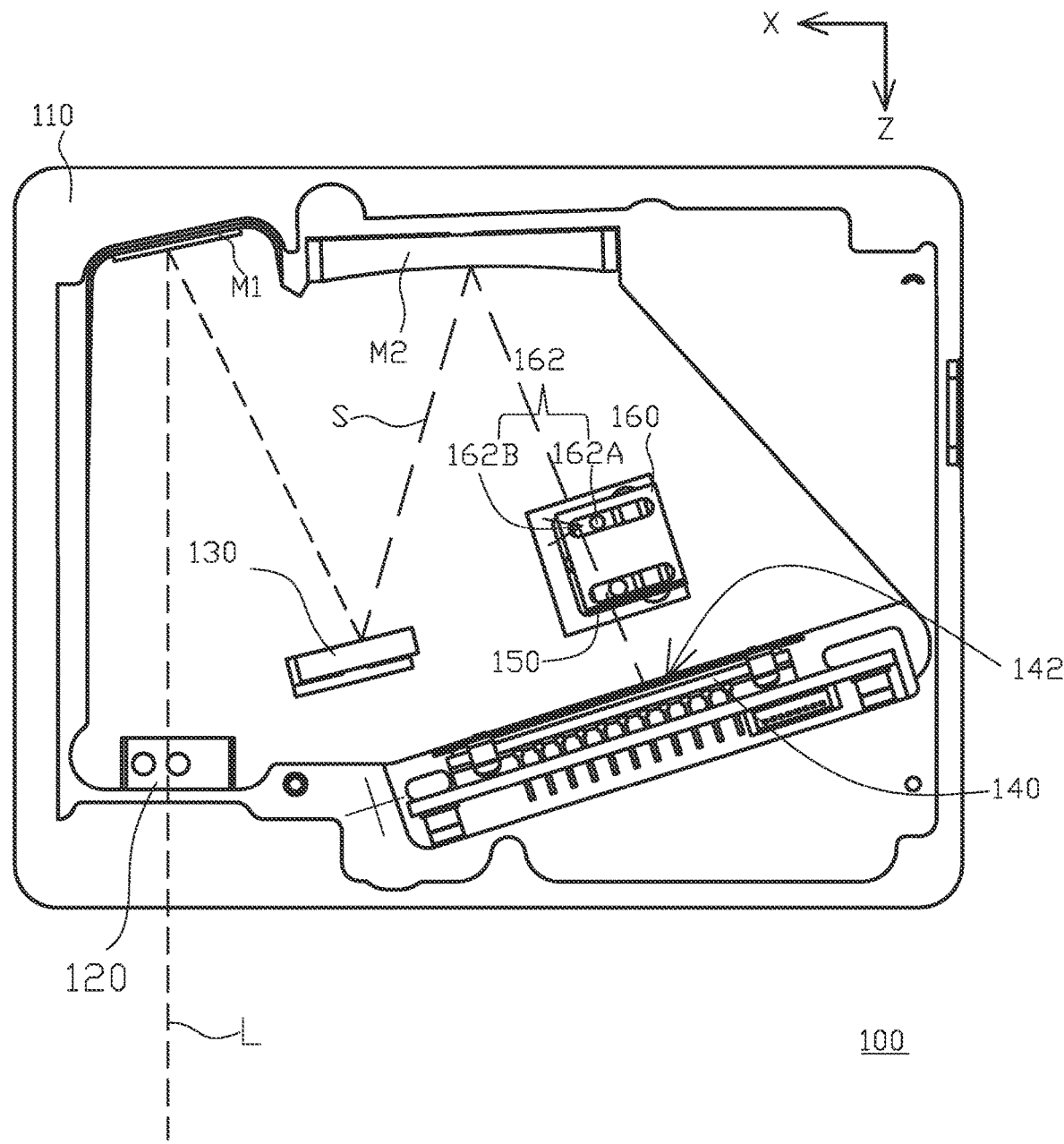
FIG. 2 shows a schematic top side plan view of the spectrometer of FIG. 1.

FIG. 1 shows a schematic perspective view of a spectrometer 100 in accordance with a preferred embodiment of the present invention. FIG. 2 shows a schematic top plan view of the spectrometer 100 of FIG. 1. Please refer to FIG. 1 and FIG. 2, the spectrometer 100 includes a base 110, a light input 120, a light splitter 130, an image sensor 140 and a shader 150. The light input 120 is disposed on the base 110 for receiving an optical signal L. The light splitter 130 is disposed on the base 110 for incidence of the optical signal L received by the light input 120, and to split the optical signal L into a plurality of spectral components S. In the preferred embodiment of the present invention, the spectrometer 100 further includes a reflector M1 disposed on the base 110 for incidence of the optical signal L received by the light input 120, and to reflect the optical signal L toward the light splitter 130. The light splitter 130 is, for example, a planar optical grating for incidence of the optical signal L reflected by the reflector M1, and to split the optical signal L into the plurality of spectral components S. In another embodiment not shown in drawings, the light splitter 130 can also be a concave optical grating, but is not limited thereby. The image sensor 140 is disposed on the base 110, and has a sensing surface 142 for receiving the plurality of spectral components S. In the preferred embodiment of the present invention, the spectrometer 100 further includes a focusing mirror M2 disposed on the base 110 for focusing the plurality of spectral components S split by the light splitter 130. The image sensor 140 receives the plurality of spectral components S focused by the focusing mirror M2. The shader 150 is disposed between the light splitter 130 and the image sensor 140 according to an optical influence factor, and is located on a projection path of a portion of the plurality of spectral components S. The shader 150 shades the portion of the plurality of spectral components S to suppress a part of the plurality of spectral components S having excessively high light intensity. In the preferred embodiment of the present invention, the optical influence factor includes at least one of a preliminary frequency spectrum of the optical signal L, a splitting efficiency of the light splitter 130 for each of lights with different wavelengths, a reflectivity of the reflector M1 and a reflectivity of the focusing mirror M2, and a light sensing efficiency of the image sensor 140 for the each of lights with different wavelengths. For instance, the plurality of spectral components S having excessively high light intensity is defined by the plurality of spectral components S having a light intensity more than a threshold value. The threshold value is decided according to the optical influence factor.

In details, the shader 150 is disposed between the focusing mirror M2 and the image sensor 140, and can be an opaque piece, a neutral density filter or a filter. The shader 150 is configured to shade a part of the plurality of spectral components S focused by the focusing mirror M2. In addition, the spectrometer 100 further includes a mounting part 160. The shader 150 is disposed on the mounting part 160, and the mounting part 160 is disposed on the base 110 so that the shader 150 is disposed on the base 110 via the mounting part 160. The mounting part 160 also can have an adjusting structure 162 configured to adjust a setting angle or a setting position of the shader 150 relative to the base 110, to adjust a setting position of the shader 150 along a direction parallel to the sensing surface 142, or to adjust the shader 150 for moving away from or moving toward the base 110. In the preferred embodiment of the present invention, the adjusting structure 162 includes at least a locking piece 162A and at least a guiding slot 162B to constitute the adjusting structure 162. By means of engagement between the locking piece 162A and the guiding slot 162B, the shader 150 is guided and moved to be positioned and fixed along a X direction (i.e., the direction parallel to the sensing surface 142 as stated above) or a Z direction (i.e., a direction moving away from or moving toward the base 110 as stated above) as shown in FIG. 2. In another embodiment not shown in drawings, the shader 150 can be directly attached to the image sensor 140 or the focusing mirror M2, or can be moved along a Y direction as shown in FIG. 1 to be positioned at a location relatively close to the base 110 or a location away from the base 110.

Figure 3A:
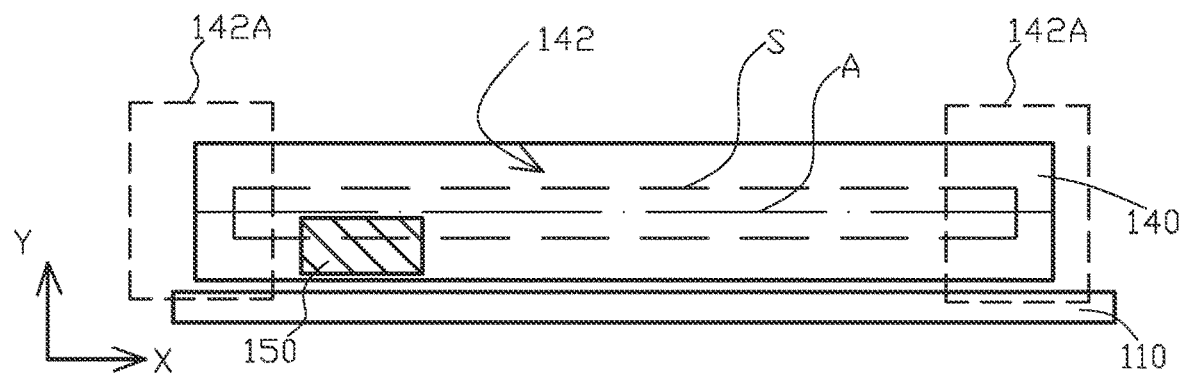
FIG. 3A shows a schematic side elevational view showing a relative relationship between a shader and an image sensor of the spectrometer of FIG. 1.

FIG. 3A shows a schematic side elevational view showing a relative relationship between the shader 150 and the image sensor 140 of the spectrometer 100 of FIG. 1. Please refer to FIG. 3A, the sensing surface 142 has a virtual central line A extending along an arrangement direction of the plurality of spectral components S. A shadow generated by the shader 150 on the sensing surface 142 does not fall on the virtual central line A. Although the virtual central line A is schematically presented as a straight line in FIG. 3A, the virtual central line A is defined as a virtual line connected by centers of all wavelengths of the plurality of spectral components S, and is parallel to the X direction. Meanwhile, a virtual vertical line parallel to the Y direction is defined on the sensing surface 142 to be perpendicular to the virtual central line A. As a result, the virtual central line A can actually be a curve line according to a particular light shape. Particularly, the sensing surface 142 extends on the base 110 and has two end portions 142a. The shadow generated by the shader 150 on the sensing surface 142 further does not fall on the two end portions 142a. Since the part of the plurality of spectral components S received at the two end portions 142a usually has a weaker light intensity, an optical resolution of the spectrometer 100 can further be avoided to be reduced via the above characteristic that the shadow generated by the shader 150 on the sensing surface 142 does not fall on the two end portions 142a.

Figure 3B:
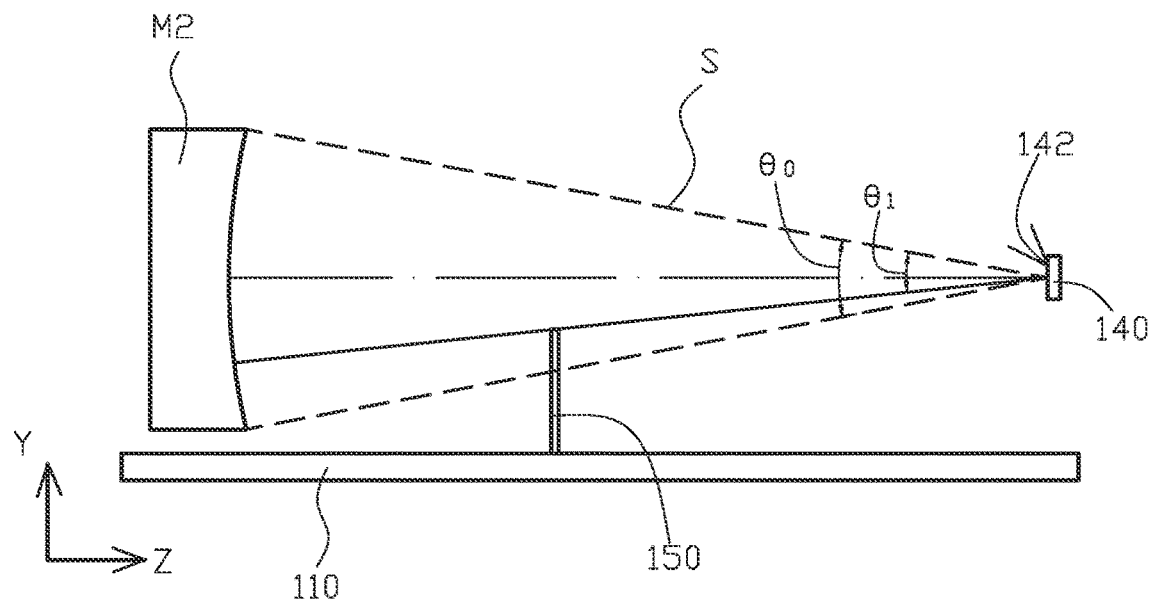
FIG. 3B shows a schematic side elevational view showing changes of a divergence angle before and after disposition of the shader in the spectrometer of FIG. 1.

FIG. 3B shows a schematic side elevational view showing changes of a divergence angle before and after disposition of the shader 150 in the spectrometer 100 of FIG. 1. A virtual plane is defined along the virtual vertical line to be perpendicular to the sensing surface 142. Please refer to FIG. 3B, a divergence angle $\theta_1$ of a light path of each spectral component S out of a shaded part, by the shader 150, of the plurality of spectral components S along the virtual plane after the shader 150 is disposed in the spectrometer 100 is smaller than a divergence angle $\theta_0$ of the light path of the each spectral component S out of the shaded part of the plurality of spectral components S along the virtual plane before the shader 150 is disposed in the spectrometer 100. Hence, an optical resolution of the spectrometer 100 corresponding to the divergence angle $\theta_1$ is larger than an optical resolution of the spectrometer 100 corresponding to the divergence angle $\theta_0$. In other words, in the present embodiment of the present invention (i.e., in the case that the shader 150 is not directly attached to the image sensor 140), since a focusing numerical aperture of the spectrometer 100 is reduced due to the shader 150, an effect of the numerical aperture being smaller, an imaging optical aberration for the spectrometer 100 being smaller and the optical resolution of the spectrometer 100 for shaded wave bands of the plurality of spectral components S being enhanced can be achieved. On the other hand, a divergence angle $\theta_0$ of a light path of each spectral component S out of an unshaded part, i.e., without shading of the shader 150, of the plurality of spectral components S along the virtual plane keeps unchanged because the shader 150 is not disposed in its light path.

Figure 4:
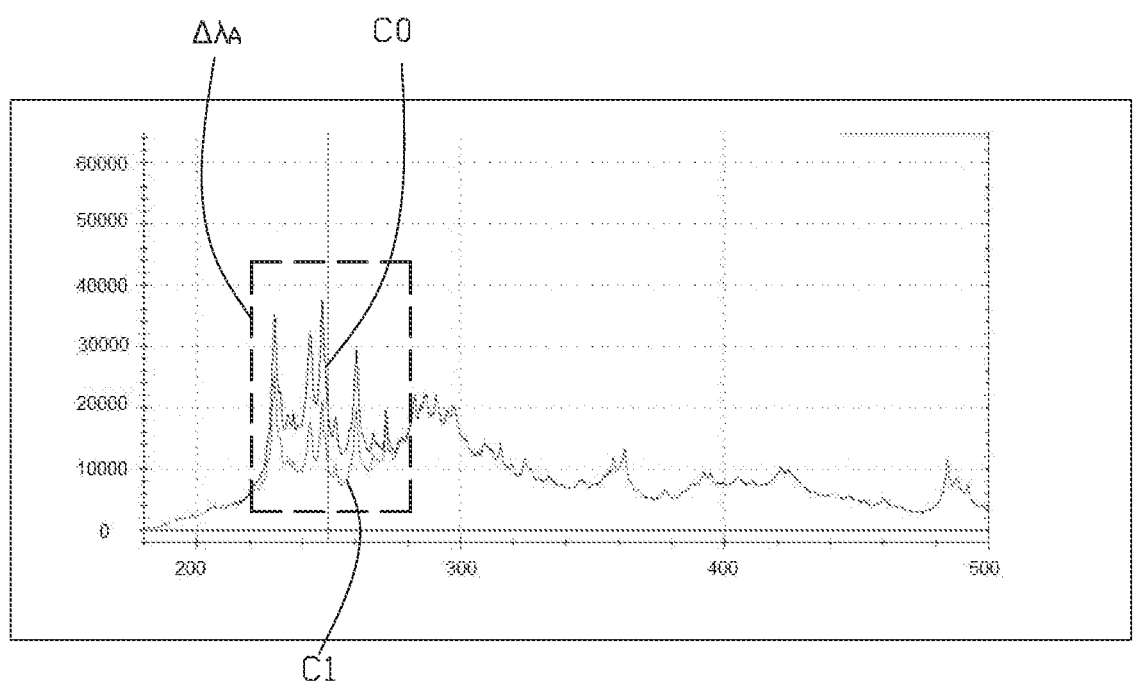
FIG. 4 shows a schematic spectrogram of the spectrometer of FIG. 1.

FIG. 4 shows a schematic spectrogram of the spectrometer 100 of FIG. 1. Please refer to FIG. 4, the spectrogram includes two spectrogram curves C0 and C1. The spectrogram curve C0 is presented to show experimental data when the shader 150 is not disposed in the spectrometer 100. The spectrogram curve C1 is presented to show experimental data after the shader 150 is disposed in the spectrometer 100. It can be learned from the spectrogram that, in a wavelength interval $\Delta\lambda_A$ (i.e., a wavelength range around 220-280 nm), a part of the plurality of spectral components S having excessively high light intensity is apparently suppressed as shown in the spectrogram curve C1 in comparison to the spectrogram curve C0, and a maximum light sensing capacity of the image sensor 140 is not therefore exceeded. Hence, a light intensity of a part of the plurality of spectral components S with other wavelengths can be increased via a method of time integration in order to enhance balansability of an integral light intensity. In addition, outside the range of the wavelength interval $\Delta\lambda_4$, the optical resolutions of the spectrometer 100 according to the spectrogram curves C0 and C1 are both, for example, 0.5 nm. However, the optical resolution according to the spectrogram curve C0 is, for example, 0.5 nm, and the optical resolution according to the spectrogram curve C1 is, for example, 0.3 nm. In other words, in the range of the wavelength interval $\Delta\lambda_4$, the optical resolution corresponding to the spectrogram curve C1 is higher than the optical resolution corresponding to the spectrogram curve C0.

Figure 5A:
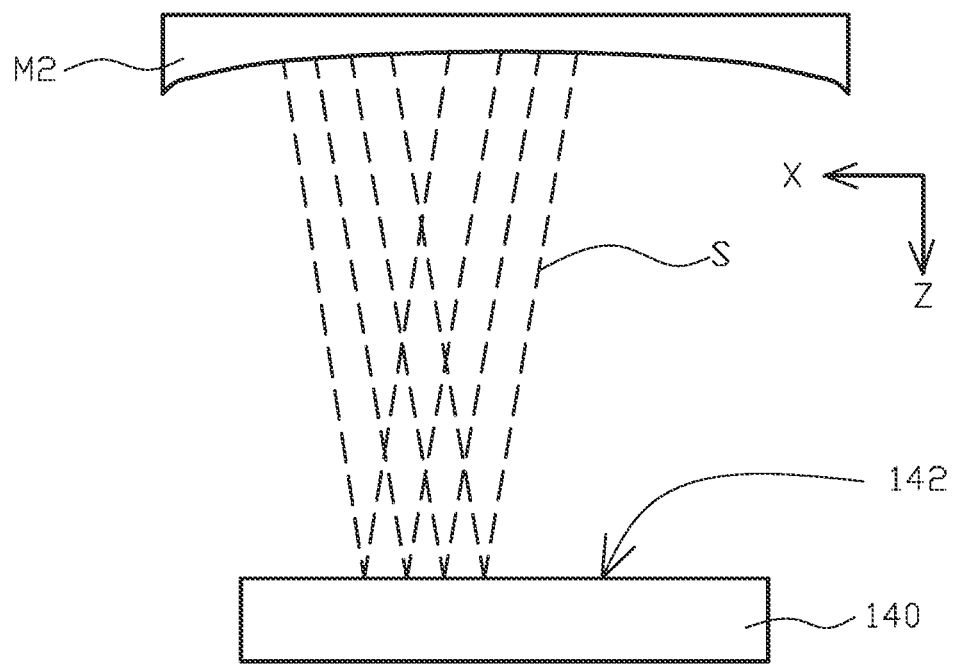
FIG. 5A shows a schematic top side plan view of the spectrometer of FIG. 1 except being without disposition of the shader in accordance with a preferred embodiment of the present invention.
Figure 5B:
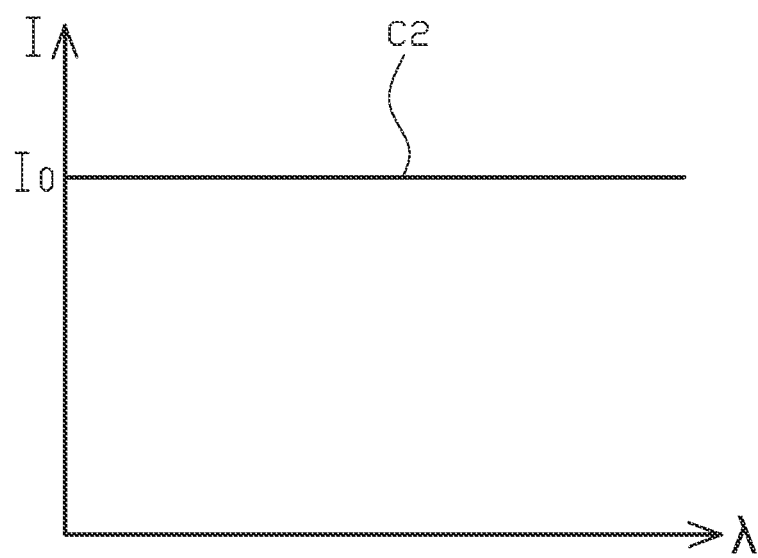
FIG. 5B shows a schematic spectrogram of the spectrometer of FIG. 5A.
Figure 6A:
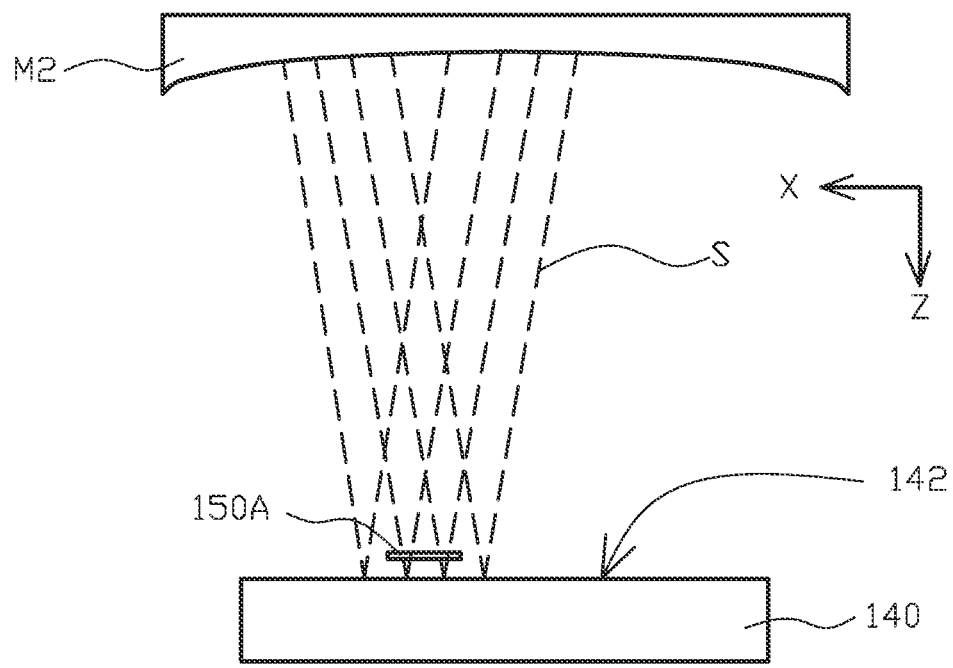
FIG. 6A shows a schematic top side plan view of the spectrometer of FIG. 1 except disposing the shader close to the image sensor in accordance with a preferred embodiment of the present invention.
Figure 6B:
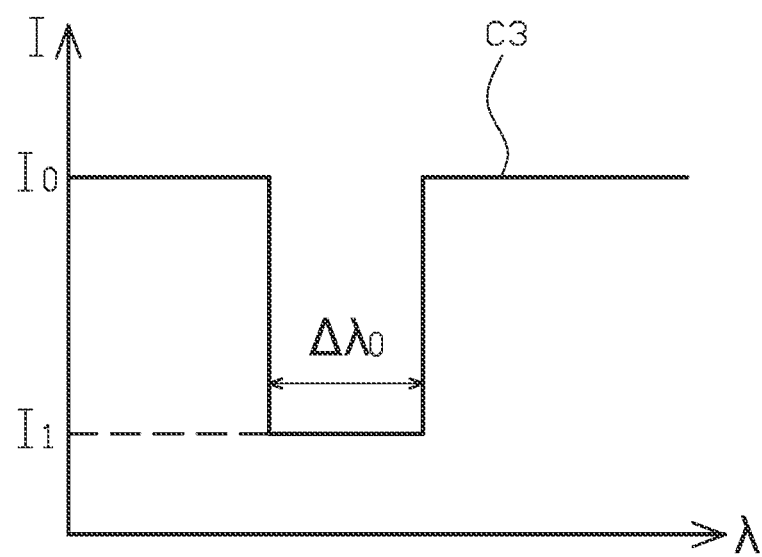
FIG. 6B shows a schematic spectrogram of the spectrometer of FIG. 6A.

FIG. 5A shows a schematic top side plan view of the spectrometer 100 of FIG. 1 except being without disposition of the shader 150 in accordance with a preferred embodiment of the present invention. FIG. 5B shows a schematic spectrogram of the spectrometer of FIG. 5A. Please refer to FIG. 5A and FIG. 5B. For convenience of illustrations, FIG. 5A only shows schematically the focusing mirror M2, the image sensor 140 and a part of the plurality of spectral components S focused on the sensing surface 142, and a spectrogram curve C2 shown in FIG. 5B is presented as a straight line (a vertical axis I in FIG. 5B represents "light intensity", a transverse axis $\lambda$ represents "wavelength"). FIG. 6A shows a schematic top side plan view of the spectrometer 100 of FIG. 1 except disposing a shader 150A close to the image sensor 140 in accordance with a preferred embodiment of the present invention. FIG. 6B shows a schematic spectrogram of the spectrometer of FIG. 6A. Please refer contrastively to FIG. 5A and FIG. 6A, the shader 150A in FIG. 6A is disposed close to the image sensor 140. Please further refer contrastively to FIG. 5B and FIG. 6B, as a result, a light intensity $I_0$ is suppressed as a light intensity $I_1$ in a wavelength interval $\Delta\lambda_0$ according to a spectrogram curve C3 shown in FIG. 6B in comparison to the spectrogram curve C2.

Figure 7A:
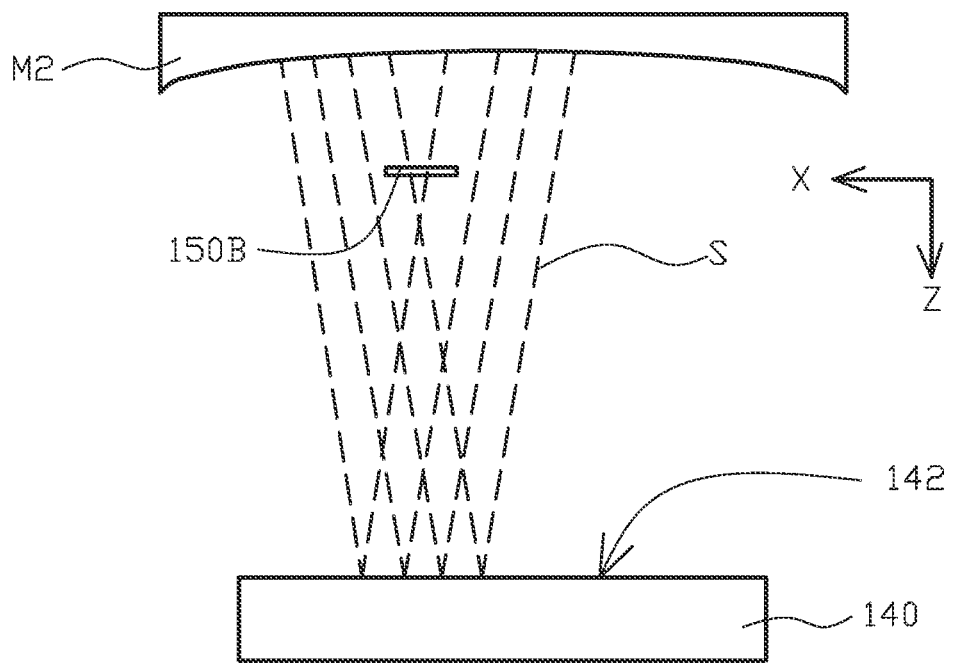
FIG. 7A shows a schematic top side plan view of the spectrometer of FIG. 1 except disposing the shader away from the image sensor in accordance with a preferred embodiment of the present invention.
Figure 7B:
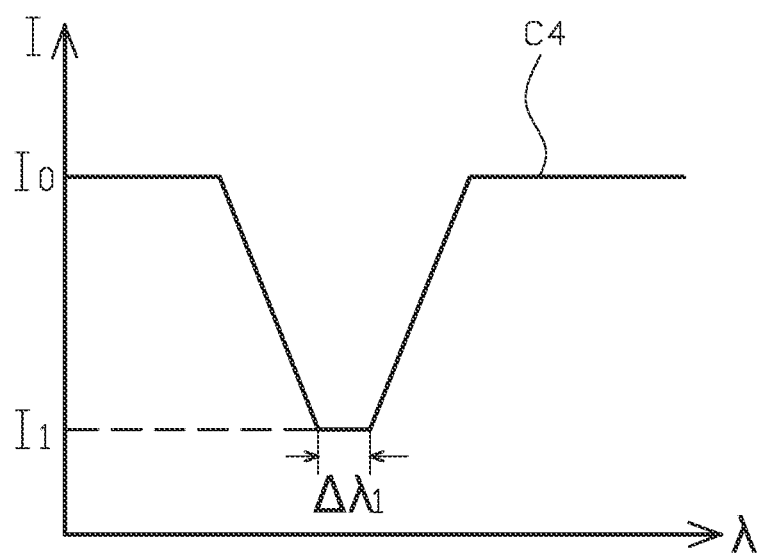
FIG. 7B shows a schematic spectrogram of the spectrometer of FIG. 7A.

FIG. 7A shows a schematic top side plan view of the spectrometer 100 of FIG. 1 except disposing a shader 150B away from the image sensor 140 in accordance with a preferred embodiment of the present invention. FIG. 7B shows a schematic spectrogram of the spectrometer of FIG. 7A. Please refer contrastively to FIG. 6A and FIG. 7A, in comparison to the shader 150A in FIG. 6A, a shader 150B in FIG. 7A is disposed away from the image sensor 140 (i.e., being relatively close to the focusing mirror M2). Please further refer contrastively to FIG. 6B and FIG. 7B, as a result, in comparison to the spectrogram curve C3, a wavelength interval $\Delta\lambda_1$ in a spectrogram curve C4 is ranged smaller than the wavelength interval $\Delta\lambda_0$ in the spectrogram curve C3. In other words, the shader 150A functions same as the shader 150B in order to suppress the light intensity $I_0$ as the light intensity $I_1$ except a wavelength range shaded by the shader 150A being different from a wavelength range shaded by the shader 150B. Under a premise that the shader 150A is sized same as the shader 150B, the more the shader 150 moves toward the focusing mirror M2, the broader a wavelength range shaded by the shader 150 is (i.e., an oblique angle in the spectrogram caused by shading of the shader 150 becomes flatter) and a percentage of light intensity to be shaded is higher. Relatively, under the premise that the shader 150A is sized same as the shader 150B, the more the shader 150 moves toward the image sensor 140, the narrower and more precise a wavelength range shaded by the shader 150 is (i.e., an oblique angle in the spectrogram caused by shading of the shader 150 becomes more vertical) and a percentage of light intensity to be shaded is lower.

Figure 8A:
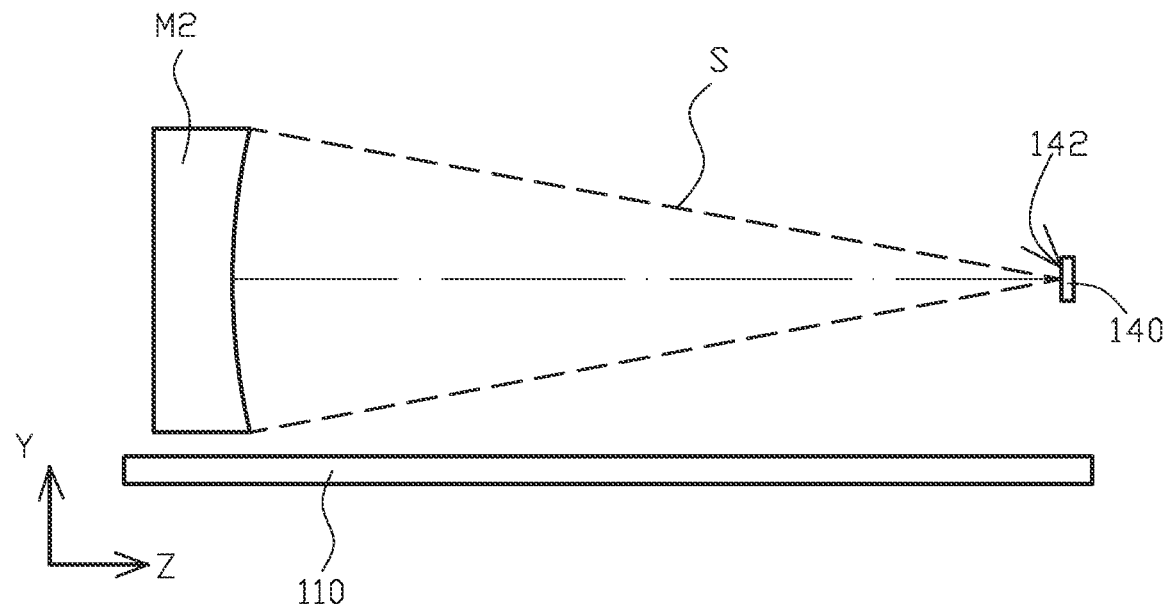
FIG. 8A shows a schematic side elevational view of the spectrometer of FIG. 1 except being without disposition of the shader in accordance with a preferred embodiment of the present invention.
Figure 8B:
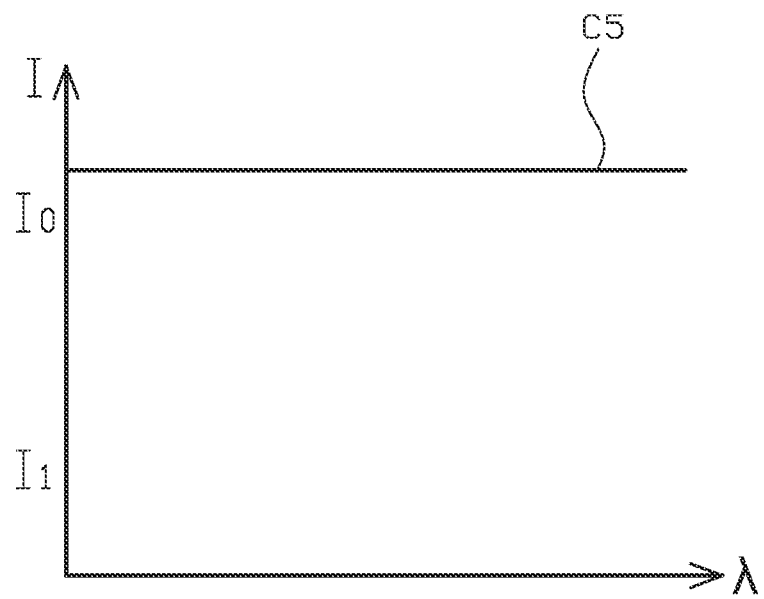
FIG. 8B shows a schematic spectrogram of the spectrometer of FIG. 8A.
Figure 9A:
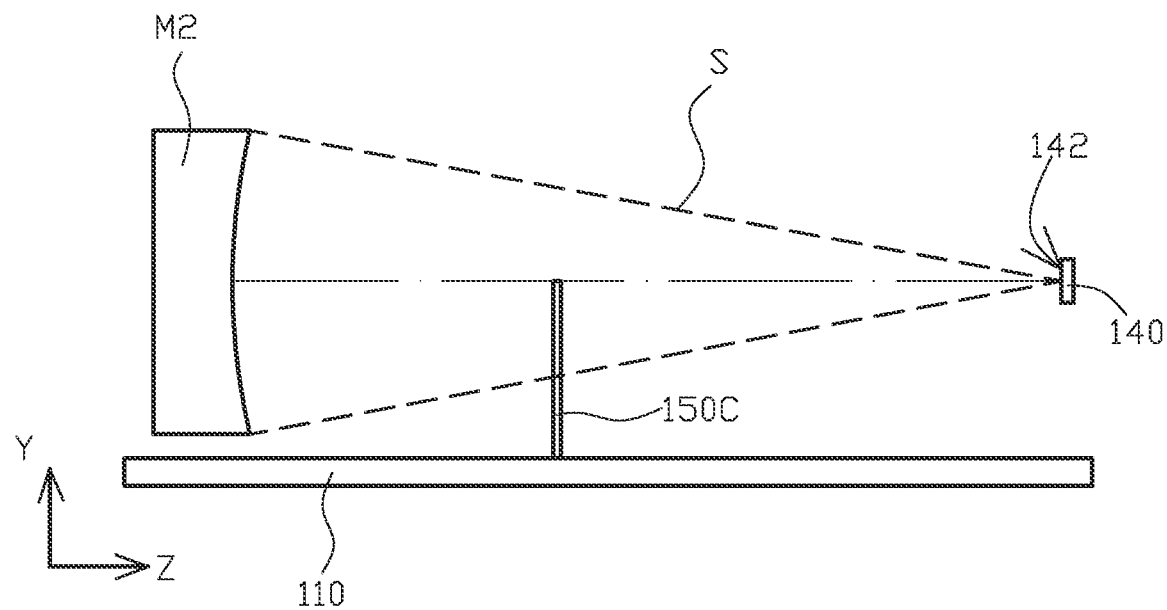
FIG. 9A shows a schematic side elevational view of the spectrometer of FIG. 1 except disposing and setting the shader as a first height thereof in accordance with a preferred embodiment of the present invention.
Figure 9B:
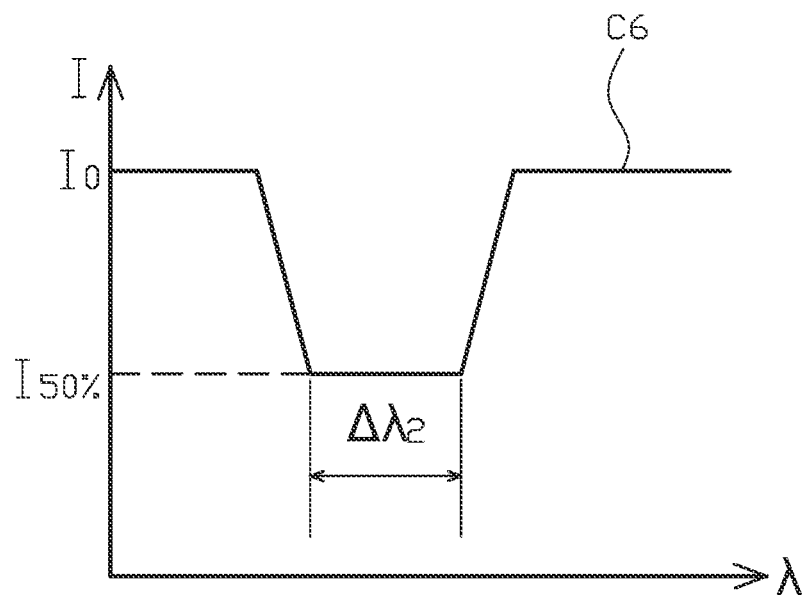
FIG. 9B shows a schematic spectrogram of the spectrometer of FIG. 9A.

FIG. 8A shows a schematic side elevational view of the spectrometer 100 of FIG. 1 except being without disposition of the shader 150 in accordance with a preferred embodiment of the present invention. FIG. 8B shows a schematic spectrogram of the spectrometer of FIG. 8A. For convenience of illustrations, FIG. 8A only shows schematically the focusing mirror M2, the image sensor 140 and a part of the plurality of spectral components S focused on the sensing surface 142, and a spectrogram curve C5 shown in FIG. 8B is presented as a straight line (a vertical axis I in FIG. 8B represents "light intensity", a transverse axis $\lambda$ represents "wavelength"). FIG. 9A shows a schematic side elevational view of the spectrometer 100 of FIG. 1 except disposing and setting the shader 150C as a first height thereof in accordance with a preferred embodiment of the present invention. FIG. 9B shows a schematic spectrogram of the spectrometer of FIG. 9A. Please refer contrastively to FIG. 8A and FIG. 9A, a shader 150C is set as the first height in FIG. 9A (i.e., a size measured along a Y direction), and the first height is approximately same as a height of a center of the plurality of spectral components S. Please further refer contrastively to FIG. 8B and FIG. 9B, as a result, in comparison to the spectrogram curve C5, the light intensity $I_0$ is suppressed as a light intensity $I_{50\%}$ (i.e., approximately 50% light intensity is suppressed) in a wavelength interval $\Delta\lambda_2$ of the spectrogram curve C6.

Figure 10A:
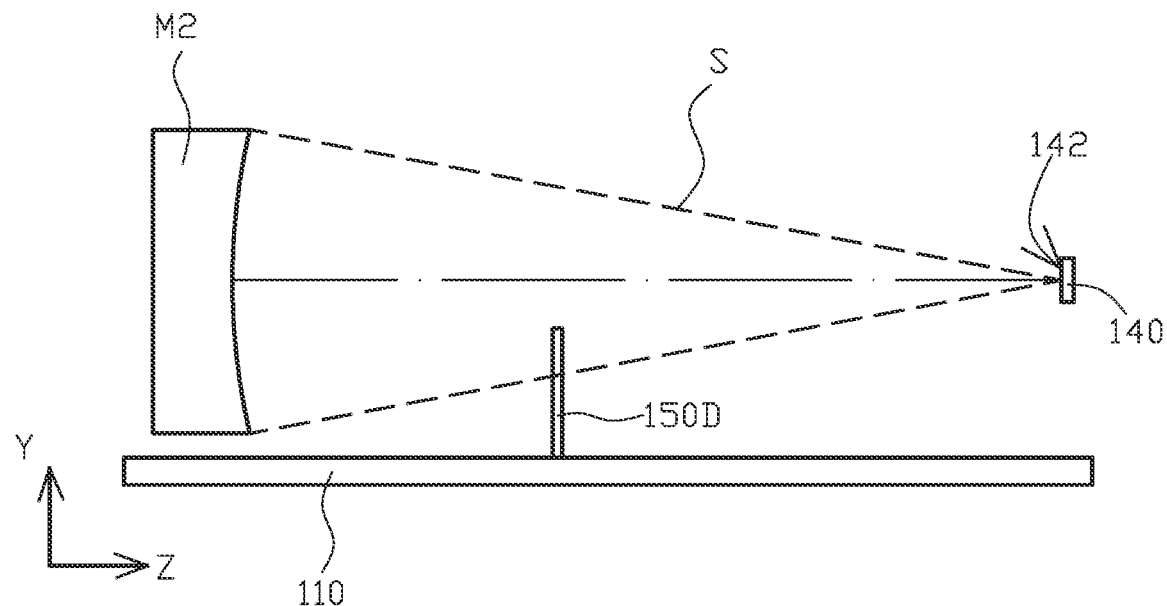
FIG. 10A shows a schematic side elevational view of the spectrometer of FIG. 1 except disposing and setting the shader as a second height thereof in accordance with a preferred embodiment of the present invention.
Figure 10B:
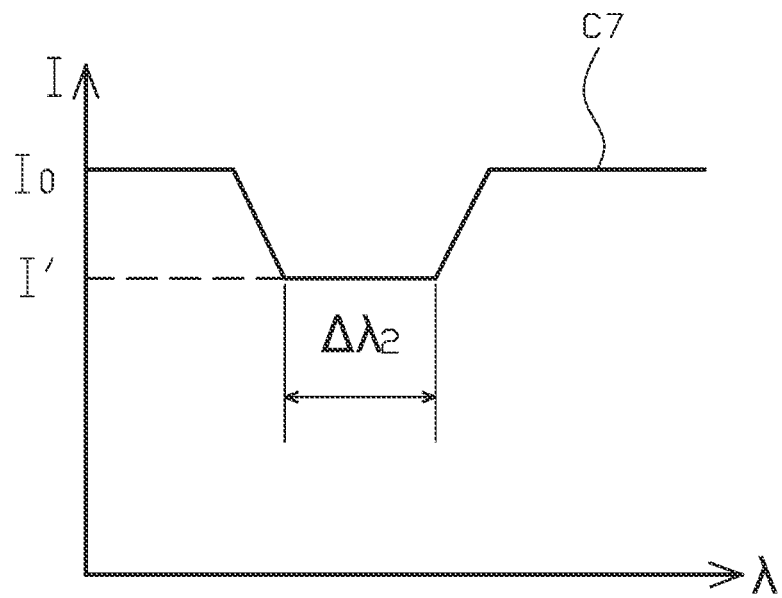
FIG. 10B shows a schematic spectrogram of the spectrometer of FIG. 10A.

FIG. 10A shows a schematic side elevational view of the spectrometer 100 of FIG. 1 except disposing and setting the shader 150D as a second height thereof in accordance with a preferred embodiment of the present invention. FIG. 10B shows a schematic spectrogram of the spectrometer of FIG. 10A. Please refer contrastively to FIG. 9A and FIG. 10A, in comparison to the shader 150C shown in FIG. 9A, a shader 150D is set as the second height in FIG. 10A (i.e., a size measured along the Y direction), and the second height of the shader 150D is smaller than the first height of the shader 150C. Please further refer contrastively to FIG. 9B and FIG. 10B, as a result, the light intensity $I_0$ is suppressed as a light intensity I' in a wavelength interval $\Delta\lambda_2$ of the spectrogram curve C7, and the light intensity I' is higher than the light intensity $I_{50\%}$ of the spectrogram curve C6. In other words, the shader 150C and the shader 150D function same to suppress light intensity of the same wavelength interval $\Delta\lambda_2$, but their percentages of light intensity to be suppressed are different. Under a premise that the shader 150C and the shader 150D have the same size, shape and position, the first height of the shader 150C is higher, and a percentage of light intensity to be shaded is also higher. On the contrary, the second height of the shader 150D is shorter, and a percentage of light intensity to be shaded is also lower. Please further refer to FIG. 9A and FIG. 10A, since the plurality of spectral components S is focused by the focusing mirror M2, the plurality of spectral components S is ranged to be narrower (i.e., a size measured along the Y direction) when the plurality of spectral components S becomes closer to the image sensor 140. Hence, when the shader 150C and the shader 150D move closer to the image sensor 140, a percentage (such as 20%) of light intensity required to be suppressed becomes much harder to be adjusted via height change of the shader 150C and the shader 150D.

Figure 11:
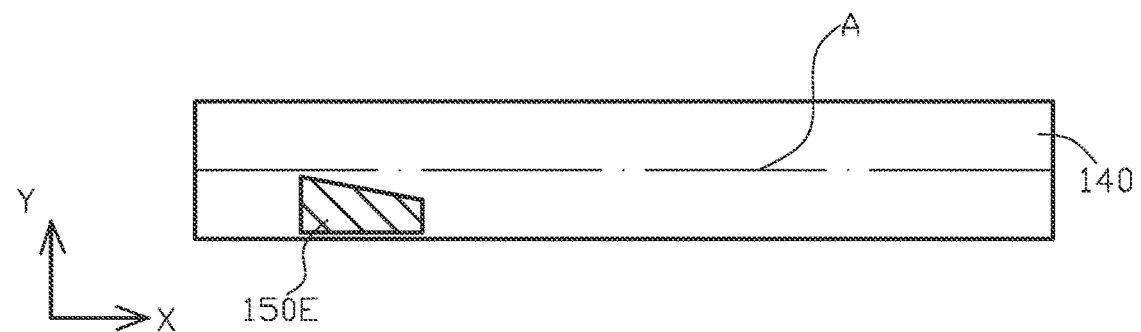
FIG. 11 shows a schematic side elevational view of the spectrometer of FIG. 1 except replacing the shader by another shape thereof in accordance with a preferred embodiment of the present invention.

FIG. 11 shows a schematic side elevational view of the spectrometer 100 of FIG. 1 except replacing the shader 150 by another shape thereof in accordance with a preferred embodiment of the present invention. Please refer contrastively to FIG. 3A and FIG. 11, in comparison to a regular shape of the shader 150 shown in FIG. 3A, such as a rectangular shape, a shader 150E as shown in FIG. 11 is a trapezoid shape. In addition, the shader 150E can also be directly attached to the image sensor 140, or be disposed away from or close to the image sensor 140. In another embodiment not shown in drawings, the shader 150E can also be selected to become other irregular shapes through a changing way of gradually changing or other kinds of changing according to the optical influence factor.

Figure 12:
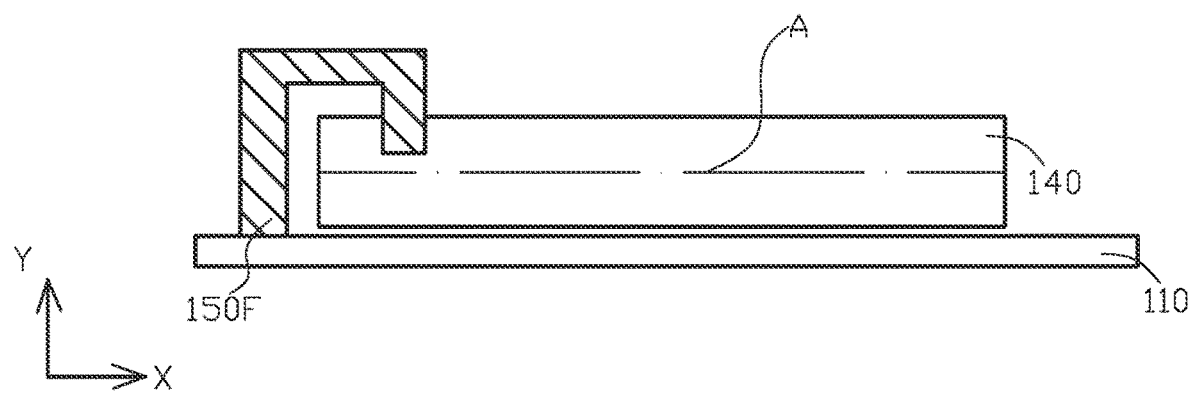
FIG. 12 shows a schematic side elevational view of the spectrometer of FIG. 1 except disposing the shader outside the image sensor in accordance with a preferred embodiment of the present invention.

FIG. 12 shows a schematic side elevational view of the spectrometer 100 of FIG. 1 except disposing the shader 150 outside the image sensor 140 in accordance with a preferred embodiment of the present invention. Please refer to FIG. 12, a shader 150F can be disposed on the base 110, extends upwards from a location on the base 110 and outside the image sensor 140, extends afterwards toward the image sensor 140 until a location corresponding to a wavelength interval to be shaded is reached, and then extends downwards. Any technical personnel in the present technical art can also be understood that an extending angle of the shader 150F is not limited to be completely vertical or horizontal, and can also be an extending angle determined based on the optical influence factor.

Figure 13:
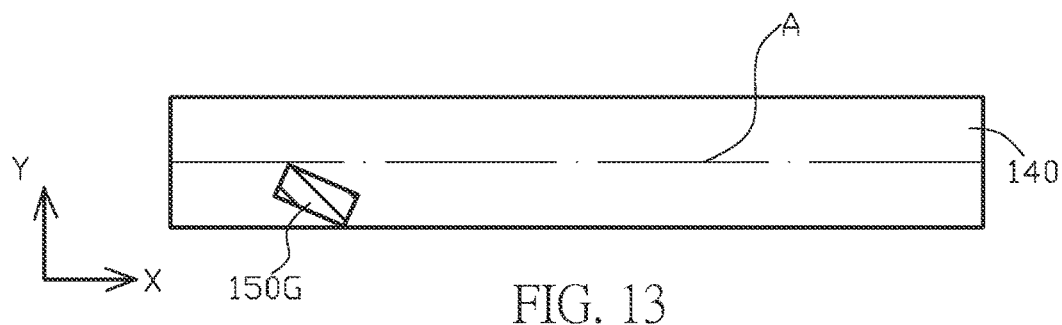
FIG. 13 shows a schematic side elevational view of the spectrometer of FIG. 1 except rotating the shader for a first angle thereof in accordance with a preferred embodiment of the present invention.
Figure 14:
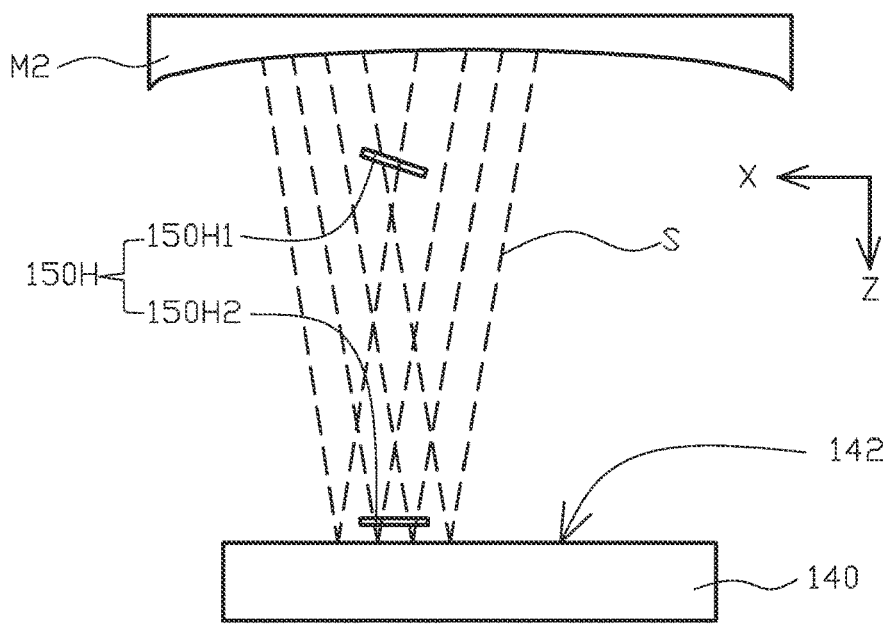
FIG. 14 shows a schematic top side plan view of the spectrometer of FIG. 1 except disposing the shader by using a plurality of shading pieces thereof, and a first shading piece out of the plurality of shading pieces being rotated for a second angle in accordance with a preferred embodiment of the present invention.

FIG. 13 shows a schematic side elevational view of the spectrometer 100 of FIG. 1 except rotating the shader 150 for a first angle thereof in accordance with a preferred embodiment of the present invention. Please refer contrastively to FIG. 3A and FIG. 13, a shader 150G shown in FIG. 13 and the shader 150 shown in FIG. 3A are same to be a rectangular shape. However, in comparison to the shader 150, the shader 150G rotates the first angle along a X-Y plane. The first angle is a multiple of a non-90-degree angle. FIG. 14 shows a schematic top side plan view of the spectrometer 100 of FIG. 1 except disposing a shader 150H by using a plurality of shading pieces thereof, and a first shading piece 150H1 out of the plurality of shading pieces being rotated for a second angle in accordance with a preferred embodiment of the present invention. Please refer to FIG. 14, the shader 150H can includes the first shading piece 150H1 and a second shading piece 150H2. In the present embodiment of the present invention, the shading piece 150H1 rotates the second angle along the X-Y plane. From the above, an advantage that a wavelength interval of a part of the plurality of spectral components S to be shaded is more precise when the shader 150H is closer to the image sensor 140 and an advantage that a percentage of light intensity to be suppressed is easier to be adjusted when the shader 150H is closer to the focusing mirror M2 are available to be considered. Hence, a required effect is achieved by rough and detailed adjustments according to the optical influence factor and requirements via a way that the shading piece 150H1 and the shading piece 150H2 are disposed at different positions between the focusing mirror M2 and the image sensor 140. In addition, in another embodiment not shown in drawings, the shader 150H can includes a plurality of different shading pieces, and each of the plurality of different shading pieces is replaceably disposed at a fixed position between the light splitter 130 and the image sensor 140 according to the optical influence factor. The plurality of different shading pieces are different from one another due to their shapes, sizes or oblique angles relative to the base 110. After either one of the plurality of different shading pieces is replaced to acquire a required optical effect, the either one of the plurality of different shading pieces can further be fixed on the base 110 through being applied with glues or being secured by screws in order to ensure that a consistent optical effect can be maintained all the time for subsequent uses of the spectrometer 100.

Figure 15:
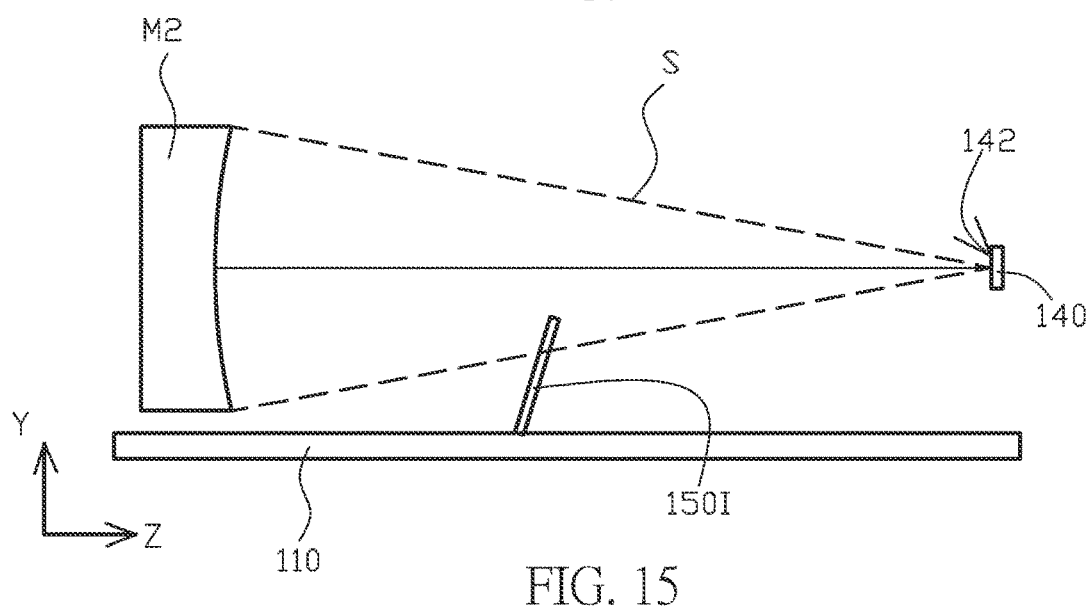
FIG. 15 shows a schematic side elevational view of the spectrometer of FIG. 1 except rotating the shader for a third angle thereof in accordance with a preferred embodiment of the present invention.

FIG. 15 shows a schematic side elevational view of the spectrometer 100 of FIG. 1 except rotating a shader 150I for a third angle thereof in accordance with a preferred embodiment of the present invention. Please refer contrastively to FIG. 10A and FIG. 15, the shader 150I has a similar height and size to the shader 150D shown in FIG. 10A, but the shader 150I is inclined relatively to the base 110 (i.e., being rotated for the third angle along a Y-Z plane). Although FIG. 13 to FIG. 15 respectively show situations that the shader 150 rotates respectively along different single planes, in further another embodiment not shown in drawings, the shader 150 can also be inclined along more than two planes or be rotated for different angles, but not be limited thereby.

Figure 16:
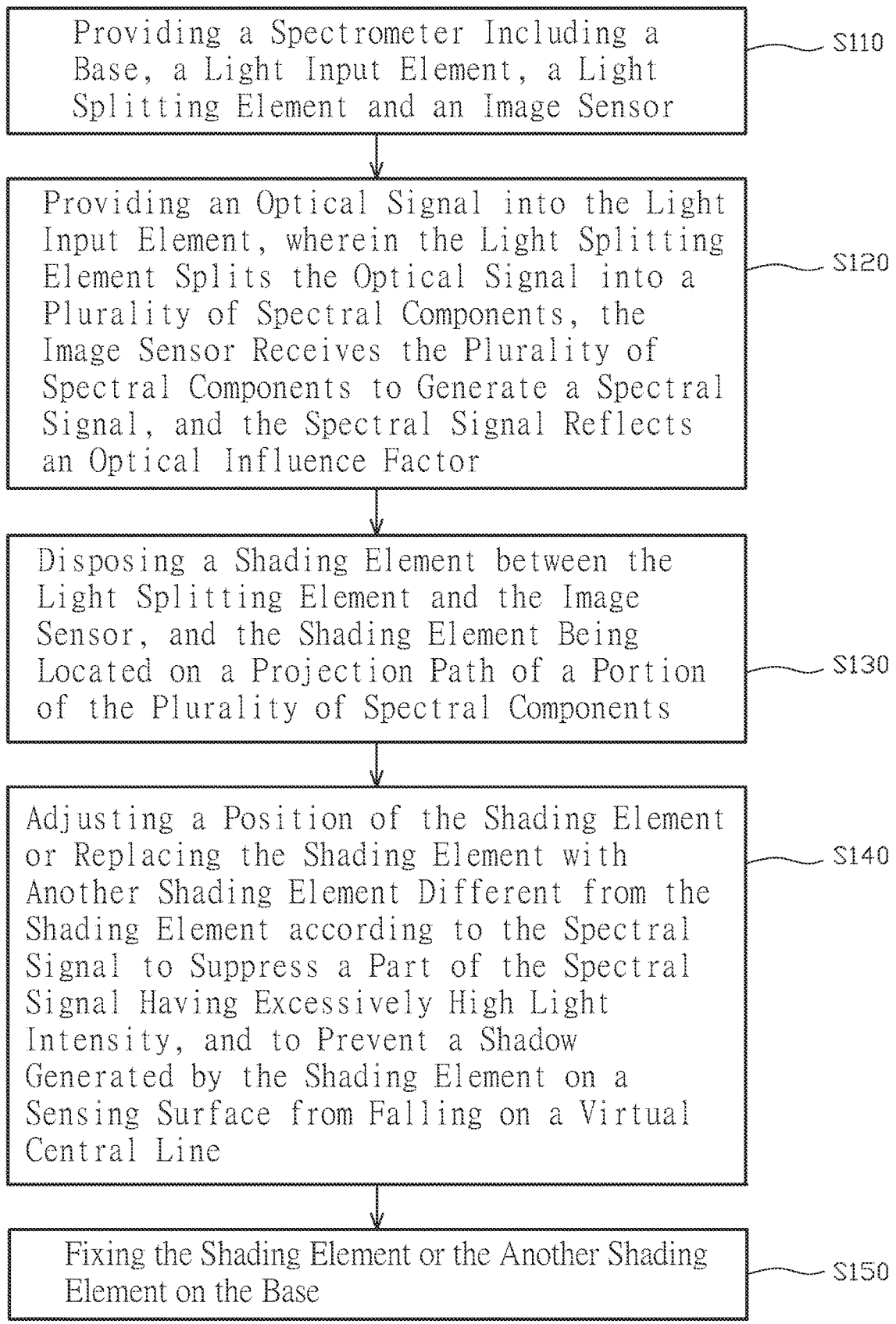
FIG. 16 shows a schematic flowchart of an assembling method for the spectrometer of FIG. 1.

FIG. 16 shows a schematic flowchart of an assembling method for the spectrometer 100 of FIG. 1. Personnel with common knowledge in the technical area can understand that each of changes to the spectrometer 100 in the above mentioned various embodiments in accordance with the present invention can be concluded to an assembling method for the spectrometer 100, and can be changed in designs or adjusted based on requirements. Therefore, all of them are not limited by the about-disclosed assembling method. Please refer to FIG. 16 and FIG. 1, assembling workflows shown in FIG. 16 are illustrated below accompanying with FIG. 1. Assembling details are already explicitly illustrated in the above mentioned embodiments, and will not be repeated herein. First of all, a step of S110 is proceeded by providing a spectrometer 100 including a base 110, a light input 120, a light splitter 130 and an image sensor 140. In the current embodiment of the present invention, in the step of S110, the above mentioned or other optical elements can be finished to be assembled and positioned beforehand. A step of S120 is subsequently proceeded by providing an optical signal L into the light input 120, wherein the light splitter 130 splits the optical signal L into a plurality of spectral components S, the image sensor 140 receives the plurality of spectral components S to generate a spectral signal (not shown), and the spectral signal reflects an optical influence factor. A step of S130 is subsequently proceeded by disposing a shader 150 between the light splitter 130 and the image sensor 140, and the shader 150 being located on a projection path of a portion of the plurality of spectral components S. A step of S140 is subsequently proceeded by adjusting a position of the shader 150 or replacing the shader 150 with another shader (not shown) different from the shader 150 according to the spectral signal to suppress a part of the spectral signal having excessively high light intensity, and to prevent a shadow generated by the shader 150 on a sensing surface 142 from falling on a virtual central line A. In the current embodiment of the present invention, a position of the shader 150 can be adjusted through the mounting part 160 shown in FIG. 1, or be adjusted by directly adopting manual operation or fixtures, and adjusting methods are not all limited to the above. It is worth mentioning that, since the spectrometer 100 may have individual difference due to every batch of elements produced for the spectrometer 100 being different from one another, influence of the individual difference of the spectrometer 100 can be reduced by reflecting an actual optical influence factor of the spectrometer 100 through the spectral signal in the current embodiment of the present invention, and by further being configured to adjust the shader 150 or to replace the shader 150 with another proper shader in order for suppressing a part of the spectral signal having excessively high light intensity.

Optionally, a step of S150 is further proceeded by fixing the shader 150 or the another shader on the base 110. In other words, after the required optical effect is achieved by adjusting a position of the shader 150 or replacing the shader 150 with another shader different from the shader 150, the shader 150 or the another shader can further be fixed on the base 110 through being applied with glues or being secured by screws in order to ensure that a consistent optical effect can be maintained all the time for subsequent uses of the spectrometer 100. Certainly, the shader 150 or the another shader can be directly or indirectly fixed on the base 110 through assembling parts such as the mounting part 160, etc., and fixing of the shader 150 or the another shader is not limited by the above.

To sum up, the spectrometer 100 in accordance with the present invention can achieve that a part of the plurality of spectral components S is shaded to suppress a portion of the plurality of spectral components S having excessively high light intensity by disposing the shader 150 between the light splitter 130 and the image sensor 140. In addition, the required optical effect is effectively achieved by using different disposing methods for the shader 150 in order to overcome disadvantageous influence from every kind of optical influence factors.

What is claimed is:

1. A spectrometer comprising:
   a base;
   a light input disposed on the base for receiving an optical signal;
   a light splitter disposed on the base for incidence of the optical signal received by the light input, and to split the optical signal into a plurality of spectral components;
   an image sensor disposed on the base, and comprising a sensing surface for receiving the plurality of spectral components, wherein a virtual central line is defined on the sensing surface and is defined as a virtual line connected by centers of all wavelengths of the plurality of spectral components, a virtual vertical line is defined on the sensing surface to be perpendicular to the virtual central line, and a virtual plane is defined along the virtual vertical line to be perpendicular to the sensing surface, the plurality of spectral components are divided on the sensing surface into a first part of the plurality of spectral components within a first wavelength interval having excessively high light intensity and a second part of the plurality of spectral components within a second wavelength interval having non-excessively-high light intensity according to a preliminary frequency spectrum of the optical signal, the first and second parts of the plurality of spectral components are both signally receivable on the sensing surface; and
   a shader having a non-ring shape, and disposed between the light splitter and the image sensor, wherein the shader is located on a projection path of the first part of the plurality of spectral components rather than being located on a projection path of the second part of the plurality of spectral components, a shadow generated by the shader falls on an area of the sensing surface corresponding to the first part of the plurality of spectral components for suppressing the first part of the plurality of spectral components rather than falling on another area of the sensing surface corresponding to the second part of the plurality of spectral components;
   wherein a divergence angle of a light path of each spectral component out of the second part of the plurality of spectral components along the virtual plane is unchanged after the shader is disposed in the spectrometer while a divergence angle of a light path of each spectral component out of the first part of the plurality of spectral components along the virtual plane is reduced after the shader is disposed in the spectrometer.

2. The spectrometer as claimed in claim 1, wherein the sensing surface extends on the base and comprises two end portions, the shadow generated by the shader on the sensing surface does not fall on the two end portions.

3. The spectrometer as claimed in claim 1, wherein the shader is directly attached to the image sensor, or is disposed relatively close to the image sensor or away from the image sensor.

4. The spectrometer as claimed in claim 1, further comprising a mounting part, wherein the shader is disposed on the mounting part, and the mounting part is disposed on the base so that the shader is disposed on the base via the mounting part.

5. The spectrometer as claimed in claim 4, wherein the mounting part comprises an adjusting structure configured to adjust a setting angle or a setting position of the shader relative to the base, to adjust a setting position of the shader along a direction parallel to the sensing surface, or to adjust the shader for relatively moving away from or moving toward the base.

6. The spectrometer as claimed in claim 5, wherein the adjusting structure comprises at least a locking piece and at least a guiding slot, the shader is guided and moved to be positioned and fixed along a direction by engagement between the at least a locking piece and the at least a guiding slot.

7. The spectrometer as claimed in claim 1, wherein the shader is an opaque piece, a neutral density filter or a filter.

8. The spectrometer as claimed in claim 1, wherein a shape of the shader is changed based on a preliminary frequency spectrum of the optical signal.

9. The spectrometer as claimed in claim 1, wherein a shape of the shader corresponding to a preliminary frequency spectrum of the optical signal is a regular shape or an irregular shape.

10. The spectrometer as claimed in claim 1, wherein a shape of the shader corresponding to a preliminary frequency spectrum of the optical signal is a rectangular shape, a trapezoid shape or a gradually changing shape.

11. The spectrometer as claimed in claim 1, wherein the shader is inclined along more than two planes or is rotated for different angles based on a preliminary frequency spectrum of the optical signal.

12. The spectrometer as claimed in claim 1, wherein a height of the shader is same as a height of a center of the plurality of spectral components.

13. The spectrometer as claimed in claim 1, wherein the first part of the plurality of spectral components has a light intensity more than a threshold value.

14. The spectrometer as claimed in claim 1, wherein the shader comprises a plurality of different shading pieces, each of the plurality of different shading pieces is replaceably disposed at a fixed position between the light splitter and the image sensor according to the preliminary frequency spectrum, the plurality of different shading pieces are different from one another due to their shapes, sizes or oblique angles relative to the base.

15. The spectrometer as claimed in claim 1, further comprising a mounting part, wherein the shader is disposed on the mounting part, and the mounting part is disposed on the base so that the shader is disposed on the base via the mounting part;
   the mounting part comprises an adjusting structure configured to adjust a setting angle or a setting position of the shader relative to the base, to adjust a setting position of the shader along a direction parallel to the sensing surface, or to adjust the shader for relatively moving away from or moving toward the base;

the sensing surface extends on the base and comprises two end portions, the shadow generated by the shader on the sensing surface does not fall on the two end portions; and the shader comprises a plurality of different shading pieces, each of the plurality of different shading pieces is replaceably disposed at a fixed position between the light splitter and the image sensor according to a preliminary frequency spectrum of the optical signal, the plurality of different shading pieces are different from one another due to their shapes, sizes or oblique angles relative to the base.

16. The spectrometer as claimed in claim 1, further comprising a focusing mirror disposed on the base, and disposed between the light splitter and the image sensor, the focusing mirror configured for focusing the plurality of spectral components split by the light splitter and traveling toward the image sensor, wherein the shader is not disposed on a location with a distance of a focusing length of the focusing mirror away from the focusing mirror.

17. A spectrometer comprising:

a base;

a light input disposed on the base for receiving an optical signal;

a reflector disposed on the base for incidence of the optical signal received by the light input and reflecting the incident optical signal;

a planar optical grating disposed on the base for incidence of the optical signal reflected by the reflector, and configured to split the optical signal into a plurality of spectral components;

a focusing mirror disposed on the base for focusing the plurality of spectral components split by the planar optical grating;

an image sensor disposed on the base, and comprising a sensing surface for receiving the plurality of spectral components focused by the focusing mirror, wherein the sensing surface extends along the base, wherein a virtual central line is defined on the sensing surface and is defined as a virtual line connected by centers of all wavelengths of the plurality of spectral components, a virtual vertical line is defined on the sensing surface to be perpendicular to the virtual central line, and a virtual plane is defined along the virtual vertical line to be perpendicular to the sensing surface, the plurality of spectral components are divided on the sensing surface into a first part of the plurality of spectral components within a first wavelength interval having excessively high light intensity and a second part of the plurality of spectral components within a second wavelength interval having non-excessively-high light intensity according to a preliminary frequency spectrum of the optical signal, the first and second parts of the plurality of spectral components are both signally receivable on the sensing surface;

a shader having a non-ring shape, and disposed between the focusing mirror and the image sensor, wherein the shader is located on a projection path of the first part of the plurality of spectral components rather than being located on a projection path of the second part of the plurality of spectral components, a shadow generated by the shader falls on an area of the sensing surface corresponding to the first part of the plurality of spectral components for suppressing the first part of the plurality of spectral components rather than falling on another area of the sensing surface corresponding to the second part of the plurality of spectral components, a divergence angle of a light path of each spectral component out of the second part of the plurality of spectral components along the virtual plane is unchanged after the shader is disposed in the spectrometer while a divergence angle of a light path of each spectral component out of the first part of the plurality of spectral components along the virtual plane is reduced after the shader is disposed in the spectrometer; and a mounting part disposed on the base, and the shader being disposed on the mounting part so that the shader is disposed on the base via the mounting part, wherein the mounting part comprises an adjusting structure configured to adjust a setting angle or a setting position of the shader relative to the base.

18. The spectrometer as claimed in claim 17, wherein the shader is not disposed on a location with a distance of a focusing length of the focusing mirror away from the focusing mirror.

* * * * *